United States Patent Office 3,787,586
Patented Jan. 22, 1974

3,787,586
DENSIFIED HOP PRODUCTS AND PROCESS
FOR PRODUCING SAME
Allan E. Hokanson, 6550 Willow Hollow Lane, Madeira,
Ohio 45243; Raphael Katzen, 2868 Alpine Terrace,
Cincinnati, Ohio 45208; and Bernard W. Schwartz,
63 Willow Road, New Shrewsbury, N.J. 07724
Filed Oct. 8, 1971, Ser. No. 187,681
Int. Cl. C12c 3/04
U.S. Cl. 426—221
11 Claims

ABSTRACT OF THE DISCLOSURE

The present invention relates to a process for transforming hops into a densified form without losing the valuable bittering contents during the processing operation. The invention also provides a pelletized or densified product which has long shelf life and offers improved utilization of the bittering values in the hops. In addition the process can be modified to produce hops in the form of pellets having a highly enriched resin content.

Typical densified hop products produced in accordance with the process of this invention are compressed hops in the form of pellets, briquettes, tablets and the like.

When the brewing industry uses hops purchased in bale form, the brewer maintains several months' inventory of these bales, each weighing about 200 pounds and having approximate dimensions of 1.7 feet by 2.5 feet by 4.7 foot. The bales are stored by the brewer in refrigerated rooms to minimize deterioration of the valuable bittering components. It has been found that hops lose 10 to 50% of the analyzable alpha acids during a year in cold storage. These alpha acids are the major portion of the important resins which constitute the bittering components of hops. Thus the brewer must use additional amounts of hops toward the end of a storage period to compensate for the loss of the bittering value.

It is an object of this invention to provide hops in a densified form which offers the brewer several significant advantages over conventional forms of hops such, for example, as baled hops.

A further object of this invention is to provide hops in a form by which the brewer can reduce his costs by reducing shipping volume and refrigeration space to a much lower volume required for conventional forms of hops, such as baled hops.

Another object of this invention is to provide hops in a form which makes it possible for the brewer to reduce costs by obtaining better extraction efficiency of the hops in the brewing kettle than is possible with conventional forms of hops, such as baled hops.

A still further object of this invention is to provide hops in a form which is not subject to excessive oxidation of the valuable alpha acids during storage and which therefore has retained essentially its full bittering value for a long period after the processing operation.

Another object of this invention is to provide densified hop products highly enriched in hop resin content.

Figure 1:
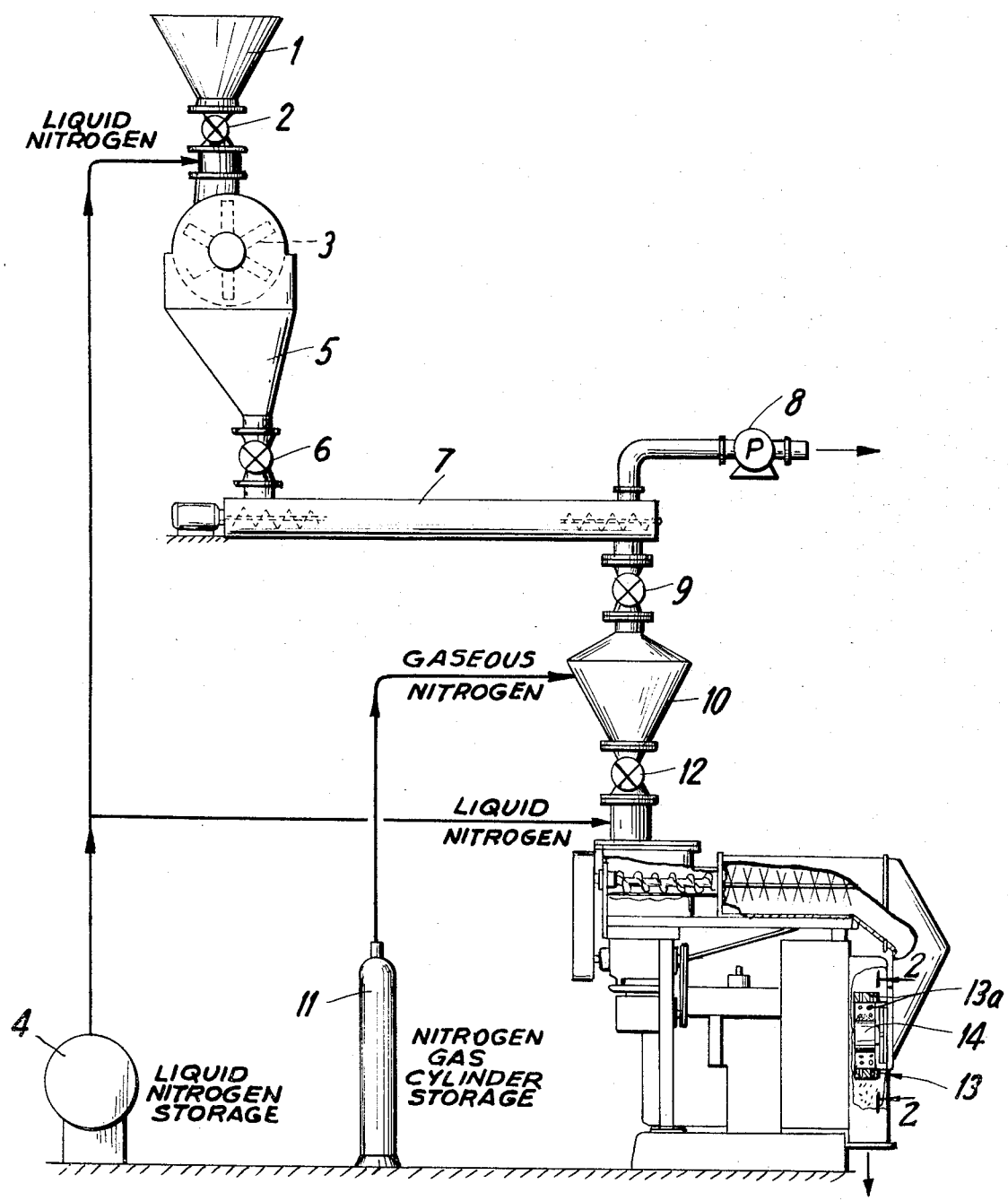
FIG. 1 is a schematic view of apparatus that may be used in carrying out the process for the production of densified hops in accordance with this invention.

It has been found that many of the objects of this invention may be realized by (1) cooling hops, prior to compressing to a densified state, to a temperature sufficiently low so that when heat is generated in a subsequent compression stage, the resulting temperature of the hops is below a temperature at which heat-sensitive resins in the hops are deleteriously affected; and (2) subjecting said cooled hops to a compression step to render the hops in a densified form.

From the foregoing discussion, it is seen that an important facet of our process is cooling the hops prior to densifying them. In processing hops or any vegetative compound into a pellet, briquette or tablet, a considerable amount of heat is generated because of the pressure required to squeeze or compress the material. We have determined that pelletization of hops causes the temperature of the hops to rise from about 70° F. to about 140° F. Because hops contain heat-sensitive resins, this high temperature level results in deterioration of a substantial amount of the resins, particularly of the valuable alpha acids which are the key components in the bittering constituents of hops. Also when pelletization is carried out at ambient temperatures, the hops are caused to become partially scorched or toasted. This effect results in a strong disagreeable odor. By means of our invention it is possible to process the hops into a densified form, such as a pellet, without causing scorching and without losing substantially any of the valuable resins.

Our process prevents degradation of the hops during pelletization by utilizing refrigeration to chill the hops to a temperature that allows the hops to leave the pelleting machine at a miximum of about 70° F., or preferably at a temperature of about 50° F. For example, if the heat generated in the pelletization causes a temperature rise of about 70° F., it is necessary to apply refrigeration to the hops feed to allow it to be cooled to about 0° F. or below, before entering the pelleting or compacting device.

The hops may be cooled by use of liquid nitrogen, solid carbon dioxide, or cold inert gases. To prevent oxidation, which causes deterioration of the resins and essential oils in the hops, an inert gas is preferred. Since liquid nitrogen is readily available as an article of commerce, it is particularly suitable, providing refrigeration as well as an inert and neutral atmosphere.

To produce pelleted hops with a long shelf life, we have found it preferable to process the hops prior to densification to reduce and preferably to remove all the occluded air present in the hops flowers. This can readily be accomplished by passing the hop material to a vacuum chamber. Instead of the use of a vacuum chamber, other suitable techniques could be used such as displacing the air in the hops by contacting with a large quantity of nitrogen gas. The use of a vacuum chamber for removing air from hops is preferred as it is more efficient and requires less gas to process the hops in a vacuum chamber first for complete removal of occluded air before replacement with nitrogen. By reducing and preferably eliminating all the air from the hop material before refrigeration and pelletizing, the bittering value of the product is extended for prolonged periods without decreasing appreciably. Furthermore, to improve the efficiency of the removal of the air trapped in the hops flower, our invention preferably includes a grinding step prior to processing the hops in the vacuum chamber. This additional grinding step makes it possible to remove substantially all of the air, thus further extending the shelf life of the subsequently-compressed hop material. Grinding of the hops may be accomplished by use of several types of devices such as a hammermill, jet energy mill, attrition mill, or pulverizer. It is essential to provide sufficient cooling of the hops before grinding to prevent any decomposition due to the heat generated during the comminuting of the hops.

Reference is now made to the drawings illustrating an embodiment of the process of this invention. The hops treated in accordance with our invention may be loose or obtained from bales. As is readily apparent to those skilled in the art, hops to be processed are first screened to remove stems, pieces of vines, etc. and subjected to a magnetic separator to remove any metal, e.g. iron material, that may be present.

Figure 2:
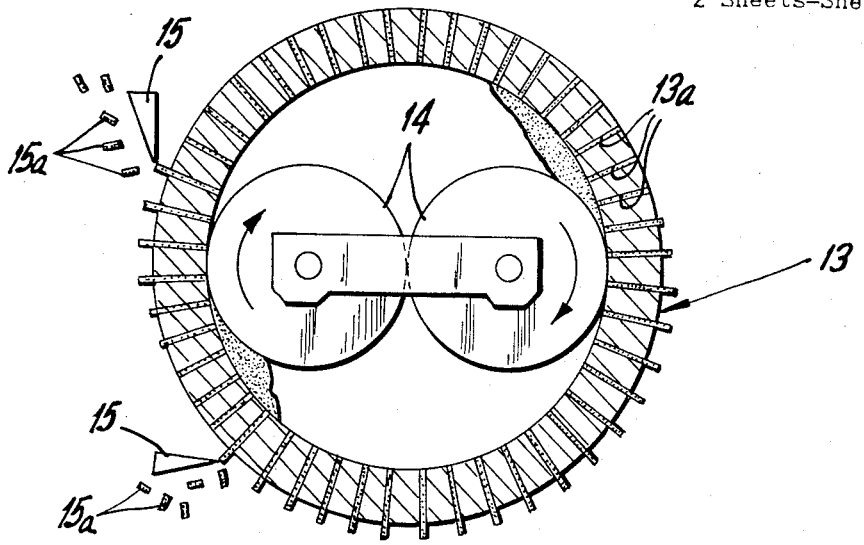
FIG. 2 is a sectional view of the pelletizing apparatus shown in FIG. 1.

Referring now to FIGS. 1 and 2, hops, which may be obtained from bales having a moisture content of approximately 7 to 9%, passes from a hops storage hopper 1 through the rotary feed valve 2 into the hammermill or grinding apparatus 3.

A small amount of liquid nitrogen from the liquid nitrogen storage vessel 4 is injected ahead of the grinder 3 in order to chill the hops to prevent overheating during the grinding operation. The ground hops from the storage hopper 5 passes through the rotary feed valve 6 into the vacuum chamber 7. A vacuum, ranging from 5 mm. to 10 mm. Hg, is provided by a vacuum pump 8. In the vacuum chamber the ground hop material is agitated, tumbled and conveyed by a ribbon-type conveyor from one end to the other. An example of a suitable retention time range within the vacuum chamber is of the order of 5 to 30 minutes. We have determined that a vacuum vessel with sufficient capacity for a retention time of 30 minutes when operating at the rate of 1000 lbs./hr. of hops, would be approximately 1000 gallons in size. A vessel with 5 minutes retention time would be approximately 150 gallons in size.

The evacuated ground hops from the vacuum chamber 7 passes through the rotary feed valve 9 into a storage hopper 10. Liquid or cold gaseous nitrogen from the gas nitrogen cylinder storage tank 11 passes into the storage hopper so that the hops are entirely immersed in a nitrogen or inert gas atmosphere before being pelletized. From the storage hopper 10, the ground hops passes through the rotary feed valve 12 into the pelletizing machine shown in FIGS. 1 and 2.

In order to overcome any tendency of the hops to cake and to facilitate ease of handling when fed through the hereinbefore-mentioned rotary feed valves 2, 6 and 9, the use of refrigeration and coated equipment has been found desirable. More particularly, in the processing of hops in accordance with our process, the hops are preferably refrigerated before being passed to the rotary feed valves 2, 6 and 9. In the system illustrated in the drawings, the hops become cool before passing through the respective rotary feed valves 2, 6 and 9 because a slight positive pressure allows the chilled nitrogen gas to pass upward in the empty pockets of the rotary valve into the chamber above. In addition to refrigeration, the use of an antifriction coating, such as a Teflon coating, on the interior of the rotary feed valves 2, 6 and 9 facilitates ease of handling.

In densifying the hop material in accordance with this invention, any conventional compacting device may be used such, for example, as any standard pelletizing device or briquetting machine. Examples of typical pelletizing machines that may be used are the "Industrial Pellet Ace" model described in Bulletin 5062 of March 1965 by Sprout-Waldron Company and the "Ranger Pellet Mill" model described in Bulletin 239–B of April 1967 by Sprout-Waldron Company. An example of a standard briquetting machine that may be used is pelleting machine model 300MS described in Bulletin 200, 1967, of Komarek-Greaves & Company.

One type of pelletizing machine which may be used to compress hops in accordance with our process is a standard unit (Industrial Pellet Ace model of Sprout-Waldron) mentioned hereinabove and schematically shown in FIGS. 1 and 2. This device is used extensively in the cattle and poultry feed industry to pelletize alfalfa and other feed constituents. The machine consists of a rotating solid metal circular disc or die 13 of a donut shape containing hundreds of holes 13a. These holes may vary in diameter from about 1/16" to 1/2", the preferred diameter for hops being from 1/16" to 1/8". As indicated earlier, liquid nitrogen is passed into the incoming hops feed ahead of the pelletizing machine. The chilled hops progress through the screw conveyor and drops into the bottom half of the rotating disc 13. Located inside of the disc are two rollers 14 which cause the feed to be ground further and squeezed into the many holes of the disc. As the hops in the form of a cylindrical shape are extruded from the disc, adjustable doctor knives 15 cut the densified hops 15a into the desired length, for hops being from 1/8" to 1/2". The pellets and gaseous nitrogen leave the machine from a chute located near the bottom, as a result of processing the hops in this machine, the density of the hops are increased from about 2 lbs./cu. ft. to about 35 lbs./cu. ft.

As indicated above, liquid nitrogen has been found to be very suitable coolant for cooling the hop material prior to densification. Liquid nitrogen, upon evaporation, cools the hops to a temperature between —50° F. and 0° F. Simultaneously, the gaseous nitrogen expands and fills the apparatus, thus allowing pelletization to be carried out in an inert gas atmosphere. As an alternate means for chilling the hops, it is possible to use indirect cooling by allowing a refrigerant to pass through heat exchange surfaces surrounding the apparatus. It would also be possible to pass refrigerant through the hollow core of the screw conveyor in the pelletizing machine. By means of mechanical refrigeration the quantity of liquid nitrogen required to process the hops can be reduced substantially. By providing additional heat exchange surface, for instance, around the periphery of the vacuum chamber 7, the use of liquid nitrogen could be reduced further. If sufficient heat exchange surface is provided, liquid nitrogen may be eliminated and only gaseous nitrogen would be necessary to provide an inert gaseous atmosphere.

Figure 3:
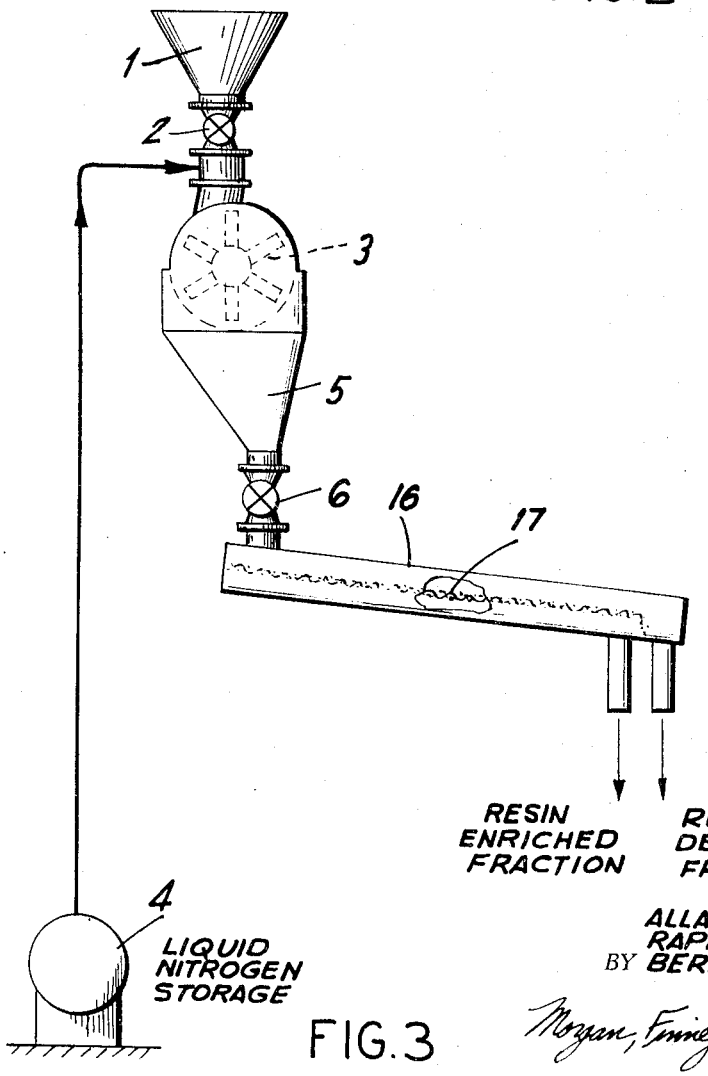
FIG. 3 is a schematic view showing apparatus that is useful in screening coarse material from fines, the fines being subsequently treated to produce densified hops of a high resin (bittering agent) content.

In accordance with a specific aspect of our invention, it has been found that densified hops of highly enriched resin content may be obtained if the hop material that is compressed in accordance with our process is in the form of fines. The fines are obtained by subjecting ground hops to a suitable separating step such, for example, as by the screening operation shown in FIG. 3. A sieve having a mesh size in the range of 60 to 200 mesh, and preferably of from 80 to 120 mesh, is useful in effecting the desired screening step. As shown in FIG. 3, comminuted hops from grinder 3 drop through the rotary feed valve 6 and in a refrigerated state are passed onto a rotary screen separator 16. The hops passing to the screen 16 are in a refrigerated state since the hops in process are in constant contact with refrigerated nitrogen gas from the liquid nitrogen system (maintained at —320° F.). The ground hops are screened on approximately a 100 mesh screen 17. A very substantial amount (e.g. 90%) of the valuable resin and essential oils of the hops pass through the screen as fines. The coarse fraction containing the woody and petal portions of the hops may be discarded or used as low grade hops. From the rotary screen 16, the resin-enriched fraction is then processed in the manner shown in FIG. 1, wherein the hops pass in through the vacuum chamber 7 and processed in the same manner as described hereinbefore with respect to FIGS. 1 and 2.

As an example of the results of our invention, we have listed in Table 1 the effects of pelletization of hops with and without the use of refrigeration in the form of liquid nitrogen. It may be seen from Table 1 that pelletization of hops without the use of nitrogen results in a loss of 24.2% of the alpha acids, which compares to a loss of only 1.5% when the hops are chilled to a temperature of below 0° F. The preferred range of moisture content of the hops feed is from 7 to 9%.

Table 1 also gives data on the effect of hammermilling prior to pelletization. When hops, having a moisture content of 8.4% are hammermilled prior to pelletization, and liquid nitrogen is used to chill the hops below 0° F., the loss of alpha acids is only 0.8%. Thus, grinding ahead of the pelletization machine facilitates removal of the occluded air, so that less oxidation and deterioration of the hops takes place.

TABLE 1

| Type hops | Alpha acids, percent dry basis | | | |
|---|---|---|---|---|
| | Feed | Pellets | Loss | Remarks |
| Baled hops—as is | 6.80 | 5.15 | 24.2 | No liquid $N_2$. |
| Do | 6.60 | 6.50 | 1.5 | Liquid $N_2$. |
| Baled hops—hammermilled | 6.70 | 6.65 | 0.8 | Do. |

In one run employing the process of our invention, calculations indicate that the volume of the baled hops would be decreased by a factor of about 3.6 or from 9.8 lb./cu. ft. for the baled hops to approximately 35 lb./cu. ft. for the pelletized hops.

If, in the screening operation, 90% of the hop resins are collected in the fines fraction, then upon pelletization the final volume could be approximately 1/3 to 1/6 of pelletized whole hops. Thus, the reduction in volume from the original baled hops would be of the order of 1/10 to 1/20.

What is claimed is:

1. A process for the preparation of a densified hop product comprising cooling unground hops, prior to compressing to a densified state, to a temperature of about 0° F. or below so that when heat is generated in a subsequent compression stage, the resulting temperature of the hops is below a temperature at which heat-sensitive resins in the hops are deleteriously affected; and, subjecting said hops while cooled to said temperature to a compression step to render the hops in a densified form.

2. A process according to claim 1 wherein the hops are compressed in a form selected from the group consisting of pellets, briquettes and tablets.

3. A process according to claim 1 wherein, prior to cooling, the hop material is subjected to a separation step wherein the hops are ground and coarse material is separated from fines, the fines being subsequently subjected to the cooling and compression steps.

4. A process according to claim 1 wherein the hops are cooled by means of an inert liquified gas.

5. A process according to claim 1 wherein the hops are cooled by means of liquid nitrogen.

6. A process according to claim 1 wherein, prior to cooling, the hops are treated to remove air present therein.

7. A process according to claim 6 wherein air is removed from the hops by passing the hops to a vacuum chamber.

8. A process according to claim 7 wherein the hops, prior to being passed to the vacuum chamber, are subjected to a grinding operation.

9. A process for the preparation of densified hop product comprising subjecting hops to a grinding operation, separating coarse material from fines, passing the fines to a vacuum chamber to remove air therefrom, cooling said hop fines to a temperature of about 0° F. or below so that when heat is generated in a subsequent compression stage, the resulting temperature of the hop fines is below a temperature at which heat-sensitive resins in the hops are deleteriously affected; and, subjecting said hop fines while cooled to said temperature to a compression step to render the hops in a more densified form.

10. A densified hop product prepared in accordance with the process of claim 1.

11. A densified hop product prepared in accordance with the process of claim 9.

References Cited

UNITED STATES PATENTS

| 3,441,416 | 4/1969 | Depmer | 99—50.5 |
| 3,096,180 | 7/1963 | Kasbaum | 99—140 |
| 3,104,974 | 9/1963 | Weiner | 99—50.5 |
| 3,275,447 | 9/1966 | Müller | 99—50.5 |

LIONEL M. SHAPIRO, Primary Examiner

R. B. PENLAND, Assistant Examiner

U.S. Cl. X.R.

426—524, 486